Patented June 15, 1943

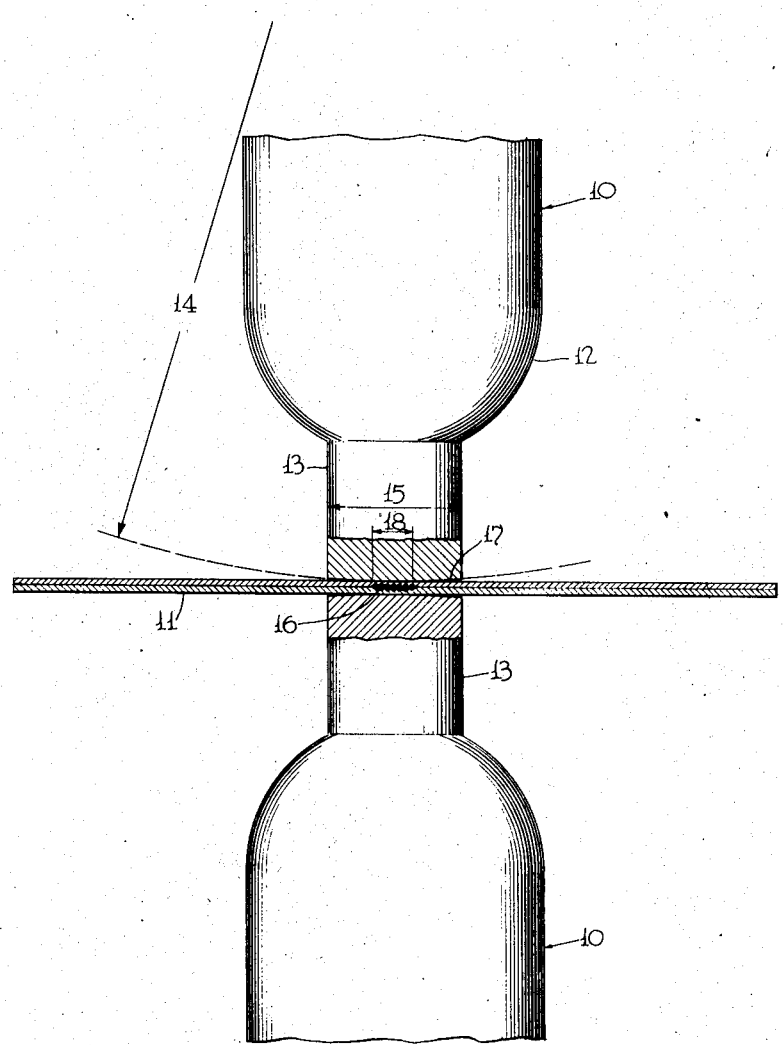

2,322,101

UNITED STATES PATENT OFFICE 2,322,101

WELDING ELECTRODE

Joseph Winlock and John J. MacKinney, Philadelphia, Pa., assignors to Edward G. Budd Manufacturing Co., Philadelphia, Pa., a corporation of Pennsylvania Application February 3, 1942, Serial No. 429,354

5 Claims. (Cl. 219—4)

This invention, the application for which is a continuation-in-part of our copending application, Serial No. 342,234, filed June 25, 1940, now Patent No. 2,298,633, October 13, 1942, relates to electrodes for use in electric resistance welding, particularly spot welding electrodes.

In order that assurance may be had that the welds produced in electric resistance welding will have the required strength, it is essential that certain conditions be maintained constant or at least substantially constant, some of these conditions being, for example, the electrode pressure, the current strength, the period of current flow, the surface character of the work to be welded, and the surface characteristics of the electrode tips.

The present invention specifically relates to the latter and has for one of its objects the provision of an electrode tip of such surface contour that, other conditions being constant, a materially greater number of welds can be made with a given electrode before redressing the tip thereof than is possible with conventional electrodes heretofore used.

Another object is to provide an electrode tip which is of such surface contour as to permit of concentration of the welding current centrally of the tip contact surface to insure an efficient weld and yet permit of control of the diameter of the weld.

A further object is to provide a welding electrode tip with a generally spherical surface of such radius as to permit an indentation of such character that the solid unmolten metal surrounding the immediate weld nugget contacts a diameter of the electrode tip contact surface at least as great as the diameter of the nugget whereby to crowd such unmolten metal firmly around the nugget under the welding pressure and prevent splaying of the molten metal of the nugget.

A still further object is to provide an electrode tip of spherical contour for use in welding thin gauge sheet metal in which the spherical surface of the tip may vary between one inch and two and one-half inches.

With the above and other objects in view which, from the description, will be apparent to those skilled in the art to which the invention appertains, the present invention consists in certain features of construction to be hereinafter described with reference to the accompanying drawing, and then claimed.

In the drawing, there is shown a pair of electrodes 10 in operative relation with a pair of thin gauge sheets 11 of metal, each electrode having a shank 12 and a tip 13 of spherical end contour, the radius 14 of the spherical surface being materially greater than the diameter 15 of the tip. The electrodes 10 and sheets 11 selected for illustration here are considerably enlarged from their actual size, the proportions however remaining the same. The weld nugget is indicated at 16 and the diameter of contact of the spherical end face 17 with the adjacent sheet 11 is indicated at 18 and shown to be substantially the same as the diameter of the nugget or weld 16.

In resistance welding, the strength of the weld, as is well known, is different for different thicknesses of metal and experimentation gives the proper welding pressure and current for a given thickness of material and weld strength.

The size or diameter of the weld is in turn determined by the weld strength, the diameter of the weld also substantially determines the diameter of the electrode tip.

Due to the concentration of current flow through the electrode tip, the full diameter of the tip is not utilized in producing a spot weld. The effective contact area is less than the tip area and centrally located within the same.

In the welding of thin gauge sheets, such as for example, stainless steel sheets of .010" thickness, with electrodes having flat tips there is considerable tendency for the contact area to grow, that is to increase in size radially. This generally results from oxidation and alloying of the tip surface, where copper electrodes are used, and primarily arises from the fact that the electrode surface is so close to the molten weld nugget that its tip surface becomes highly heated. Since the temperature of the molten nugget may be as high as 2700 degrees F., such as occurs in stainless steel, it is obvious that in thin gauge sheets of the order of .010" thickness the metal intervening between the electrode tip and weld nugget is extremely small and cannot help but become heated to a high temperature. Such heating promotes oxidation and alloying of the tip surface with the resultant irregular growth in size and consequent change in shape. The change in shape and increase in size of the contact area causes a change or decrease in current density and results in welds of inferior strength. The ultimate result is that only a few welds can be made before the electrode has to be redressed.

We have discovered that the life of a welding electrode particularly electrodes employed in welding thin gauge stainless steel sheets can be manifoldly prolonged, that is, the period between successive dressings to shape, by forming the contact surface of the tip to a generally spherical contour, the radius of which spherical surface is determined substantially by the diameter of the desired weld area.

Knowing the diameter of the weld area, the radius of the spherical tip surface is so selected that when the molten nugget has reached the diameter which is to constitute the diameter of the weld, the indentation in the work sheet due to the spherical surface will be such as to afford contact with the tip surface through a diameter at least as great as but not substantially greater than the diameter of the weld. By so adjusting the tip spherical radius to afford the contact above described, the solid unmolten metal surrounding the immediate weld nugget is pinched or crowded around the molten nugget metal, preventing splaying of the same.

Assuming for example that the welding of sheets of .010" thickness requires a weld strength necessitating the use of an electrode tip of $\frac{3}{16}$" diameter, we have found that the minimum radius of the spherical tip surface should be in the neighborhood of one and one-half inches. This radius is substantially eight times the diameter of the tip. With such a tip radius, splaying of the metal is prevented, and yet the number of welds which can be made with a given electrode before redressing is necessary is increased manifoldly over and above those possible with a flat plain tip. Very satisfactory results, however, are obtainable with an electrode of this diameter wherein the spherical surface is maintained between one and one and one-half inches. While it is true that due to wear and the high temperatures in the thinner gauge sheets there is a tendency toward enlargement of the contact area of the tip, such growth or enlargement is prolonged because such growth must occur on the spherical surface diverging away from the work sheet.

It can thus be seen that by rounding the contact surface of the electrode tip as herein described any growth or building out of the tip adjacent the contact area must occur through an appreciable axial space before it can interfere with the effective contact area and produce an inefficient weld whereas in the case of the flat plain tip any growth or building out of the tip immediately adds to the effective contact area. Our experience has been that the number of welds that can be produced with a given electrode of our invention under a given set of conditions is manifoldly increased over the number that can be produced with a flat tip electrode.

In the case of welding sheets of thickness less than .010", such as .004" and where less welding pressure is required the curvature radius may be as low as one inch. On the other hand in the welding of thicker sheets wherein greater pressures and larger diametered tips are employed it may be desirable to increase the curvature radius to two or two and one-half inches. An example of this character is the welding of stainless steel sheets of .25" thickness wherein the electrode diameter due to the increased pressures required, may be in the neighborhood of three-fourths of an inch.

As a general rule, the minimum radius of tip curvature, which provides for greatest current concentration, is determined generally by the diameter of the weld, and is such that the work sheet is in contact with a diameter of the spherical surface of the tip which is at least as great as but not substantially greater than the diameter of the weld nugget.

As it will be apparent to those skilled in the art that changes may be made without departing from the spirit of the invention, reference will be had to the appended claims for a definition of the limits of the invention.

What is claimed is:

1. A pair of opposed welding electrodes having spherical end tips, the radius of such tips ranging from substantially one inch to two and one-half inches and the length of said radius being between three to eight times the diameter of said tip.

2. A welding electrode having a spherical end tip, the radius of said tip being substantially between one inch and two and one-half inches and the length of said radius being three to eight times the diameter of said tip.

3. A spot welding electrode having a tip, said tip having a diameter of the order of three-sixteenths of an inch and a spherical end face, said end face having a radius of curvature of between one and one and one-half inches and a ratio of radius of curvature to tip diameter of from three-to-eight to one.

4. A spot welding electrode having a tip, said tip having a diameter of the order of three-sixteenths of an inch and a spherical end face, said end face having a radius of curvature of approximately one and one-half inches and said radius having a ratio to the tip diameter of approximately 8 to one.

5. A welding electrode having a spherical end tip, the radius of said tip being substantially between one inch and two and one-half inches, and several times greater than the diameter of said tip by at least three times.

JOSEPH WINLOCK.
JOHN J. MacKINNEY.